United States Patent
Tada

[11] Patent Number: 6,049,408
[45] Date of Patent: Apr. 11, 2000

[54] OPTICAL SCANNING APPARATUS

[75] Inventor: Naoyuki Tada, Kanagawa, Japan

[73] Assignee: Fuji Xerox Co., Ltd., Tokyo, Japan

[21] Appl. No.: 09/231,076

[22] Filed: Jan. 14, 1999

[30] Foreign Application Priority Data

Jan. 14, 1998 [JP] Japan .................................. 10-005463

[51] Int. Cl.$^7$ ................................................. G02B 26/08
[52] U.S. Cl. ......................... 359/204; 359/216; 359/217; 347/233; 347/243
[58] Field of Search ........................... 359/204, 216–219; 347/129, 134, 225, 231–233, 243

[56] References Cited

U.S. PATENT DOCUMENTS

| | | | |
|---|---|---|---|
| 4,547,038 | 10/1985 | Mori | 359/204 |
| 5,610,647 | 3/1997 | Takada | 347/137 |
| 5,850,306 | 12/1998 | Fukutome et al. | 359/204 |

FOREIGN PATENT DOCUMENTS

| | | |
|---|---|---|
| 1-45065 | 10/1989 | Japan . |
| 5-176128 | 7/1993 | Japan . |

OTHER PUBLICATIONS

Masao Ito et al, "Multi Beam Scanning Optics by a Laser Diode Array and Interlaced Scanning", "Optics" No. 8, vol. 23, pp. 492–497, Aug. 1994.

*Primary Examiner*—James Phan
*Attorney, Agent, or Firm*—Finnegan, Henderson, Farabow, Garrett & Dunner, L.P.P.

[57] ABSTRACT

An optical scanning apparatus for simultaneously scanning a plurality of light beams. In the apparatus, four light beams emitted from two light emitting portions are allowed to sequentially pass through collimator lenses and cylindrical lenses. Then, a beam splitter synthesizes the light beams so as to be emitted to a mirror surface of a polygonal mirror. Then, the light beams are deflected when the polygonal mirror is rotated so as to be allowed to pass through an imaging lens. Then, the light beams scan and expose (main-scan) the surface of a photosensitive member. When the photosensitive member is rotated by a predetermined quantity, sub-scanning is performed. When the above-mentioned main and sub-scanning are repeated, a latent image for one page is formed on the photosensitive member. When the above-mentioned sequential processes are performed, interlaced scanning is performed under predetermined conditions.

2 Claims, 11 Drawing Sheets

$m = 2$
$L = 2$
$n = 4$
$P = (\beta \cdot \gamma) / 2$
$d1 = 4P$
$d2 = P$ $m = 3$
$L = 3$
$n = 9$
$P = (\beta \cdot \gamma) / 3$
$d1 = 9P$
$d2 = P$ $m = 3$
$L = 2$
$n = 6$
$P = (\beta \cdot \gamma) / 2$
$d1 = 6P$
$d2 = P$

OPTICAL SCANNING APPARATUS

BACKGROUND OF THE INVENTION

1. Field of the Invention

The present invention relates to an optical scanning apparatus, and more particularly to an optical scanning apparatus for simultaneously scanning a plurality of light beams.

2. Description of the Related Art

Hitherto, an optical scanning apparatus has been known which is included in an image recording apparatus, such as a laser printer or a digital copying machine, for recording an image by scanning the surface of a photosensitive member with a light beam in accordance with image information to expose the surface of the photosensitive member to the light beam, the optical scanning apparatus being structured as shown in FIG. 9.

The optical scanning apparatus causes a light beam 14 emitted from a light emitting portion 12, such as a semiconductor laser unit, to pass through an optical system 17 comprising a collimator lens and a cylindrical lens. Then, the light beam is reflected by a mirror 24 which is moved in synchronization with rotation of a rotative polygonal mirror (hereinafter referred to as "polygonal mirror") 22 in a direction indicated by an arrow B1 shown in FIG. 9. Thus, the light beam scans a photosensitive member 28 through an imaging lens 26 so that scanning and exposure are performed along the axial direction of the photosensitive member 28 in a direction indicated by an arrow B2 shown in FIG. 9.

The image recording apparatus, such as a laser printer or a digital copying machine, incorporating the above optical scanning apparatus has been required to be capable of performing a high-speed operation and forming an image having a high quality. To meet the requirement, the following technique for simultaneously scanning a plurality of light beams has been suggested.

In Japanese Patent Examined Publication No. Hei. 1-45065, Japanese Patent Unexamined Publication No. Hei. 5-176128 and a thesis "Multi-Beam Scanning Optics by a Laser Diode Array and Interlaced Scanning"("Optics"No. 8, Vol. 23 (August 1994)), a technique has been disclosed with which the surface of a photosensitive member is interlaced-scanned by a light emitting portion having a plurality of light emitting points which can independently be light-modulated.

The technique disclosed in Japanese Patent Examined Publication No. Hei. 1-45065 has a structure incorporating two or more light emitting points disposed at an interval $\gamma$. When an imaging magnification of an imaging optical system is $\beta$, and the number of the light emitting points is n, an interval P of adjacent scanning lines on the surface of the photosensitive member satisfies the following relationship:

$$P=\beta \cdot \gamma/(xn+1) \quad (1)$$

where x is an integer satisfying $x \geq 0$.

An object of the technique disclosed in Japanese Patent Unexamined Publication No. Hei. 5-176128 is to solve the problem experienced with the technique disclosed in Japanese Patent Examined Publication No. Hei. 1-45065. That is, the scanning apparatus must have an excessively high mechanical accuracy. The technique has a structure incorporating n (n is an integer satisfying $n \geq 3$) light emitting points disposed in one light emitting portion at an interval $\gamma$. When an imaging magnification of an imaging optical system is $\beta$, I and n are relatively prime, and I is an integer satisfying $2 \geq I \geq n-1$, an interval P among adjacent scanning lines on the surface of the photosensitive member satisfies the following relationship:

$$P=(\beta \cdot \gamma)/I \quad (2)$$

In the thesis "Multi-Beam Scanning Optics by a Laser Diode Array and Interlaced Scanning" has disclosed a technique for satisfying conditions which must be satisfied when interlaced scanning disclosed in Japanese Patent Examined Publication No. Hei. 1-45065 and Japanese Patent Unexamined Publication No. Hei. 5-176128 is performed. In the thesis, conditions under which interlaced scanning can be performed have been disclosed.

The conditions which has been disclosed in the thesis and under which interlaced scanning can be performed will now be described with reference to FIG. 11. FIG. 11 shows a state in which the number of light emitting points is four and interlaced scanning is performed by skipping three scanning lines. In the drawing, S1 to S4 represent light beams emitted from the light emitting points.

To perform the interlaced scanning, two conditions below must be satisfied:

Condition 1: All of the scanning lines must be scanned.

Condition 2: Repetition of scanning of the same scanning line must be prevented.

In this case, interlaced scanning is performed such that n (n is an integer satisfying $n \geq 2$) light beams are positioned in the sub-scanning direction at an interval r which is a times interval P among scanning lines. When the light beams are moved in the sub-scanning direction by b times P at each main scanning, the light beams must exist on the scanning lines. Therefore, each of a and b is a natural number. To satisfy Condition 1, the movement distance $h \times b \cdot P$ of the leading end light beam S1 in the sub-scanning direction after scanning h (h is a natural number) times and the length $n \times a \cdot P$ of a light beam line corresponding to the distance of movement and formed in the sub-scanning direction must be the same. Therefore, the following relationship is satisfied:

$$h \times b \cdot P = n \times a \cdot P$$

That is, $$h \times b = n \times a \quad (3)$$

Since the space between light beams is filled with a required number of scanning lines as a result of h times of scanning operations, the relationship $h \cdot P = a \cdot P$, that is, the relationship $h = a$ is satisfied. Since the interval r of the light beams satisfies $r = aP$, the relationship $a = r/P = h$ is satisfied. Therefore, h is equal to a quotient (a natural number) obtained by dividing the interval r between the light beams by the interval P between the scanning lines. That is, the following relationship is satisfied:

$$h = r/P \quad (4)$$

Hereinafter, h is referred to as an interlaced period (the number of pitches in the interval r). Since h=a, the relationship b=n is satisfied in accordance with Equation (3).

Condition 2 will now be described. The scanning line which is scanned with a k-th light beam at j-th scanning is indicated as number $L(j, k) \cdot L(j, k)$ is expressed by using n and h as follows:

$$L(j, k) = (n \cdot j + 1) + h \cdot (k-1) \quad (5)$$

where j and k are as follows:

j: a serial number which is given to each main scanning and which is an integer, and k: a serial number of a light beam which is given to a leading end light beam in the sub-scanning direction and which is a natural number of 1 to n.

To prevent repetition scanning of the same scanning line, numbers of scanning lines formed by light beams given arbitrary numbers k1 and k2 (≠k1) must not coincide with each other in j1-th main scanning and j2-th main scanning in the same interlaced period h. That is, the following Equation (6) must be satisfied:

$$L(j1, k1) \neq L(j2, k2) \tag{6}$$

The following relationships are satisfied in accordance with Equation (5):

$$L(j1, k1) = (n \cdot j1 + 1) + h \cdot (k1 - 1)$$

$$L(j2, k2) = (n \cdot j2 + 1) + h \cdot (k2 - 1)$$

Therefore, substitution for Equation (6) and arrangement of the both sides result in n (j1−j2)≠h (−k1+k2). Assuming that J=j1−j2 and K=−k1+k2, the following relationship is satisfied:

$$n \cdot J \neq h \cdot K \tag{7}$$

Since each of J and K is an arbitrary integer except for 0 and the minimum value of each of k1 and k2 is 1 and the maximum value is n, the maximum value of |−k1+k2| is n−1. Therefore, K satisfies the following Equation (8).

$$|K| \leq n-1 \tag{8}$$

Since k1≠k2 at this time, K≠0.

When both of J and K are positive integers, the right side h·K of Equation (7) is h·(n−1), which is an integer smaller than h·n owing to the condition expressed by Equation (8). When h and n are relatively prime, the greatest common divisor of h and n is 1 and the least common multiple is h·n. Therefore, a value n·J obtained by multiplying n with an arbitrary integer J is not equal to h·K which is an integer smaller than h·n. Therefore, Equation (7) is satisfied. Similarly, Equation (7) is also satisfied when both of J and K are negative integers. If the signs are different from each other, Equation (7) is apparently satisfied because h and n are natural numbers.

The foregoing facts are summarized such that the conditions under which interlaced scanning can be performed are expressed as follows by using the number n of light emitting points, the interval P between adjacent scanning lines on the surface of the photosensitive member and the interlaced period h:

(1) An amount of movement (an interval d between the scanning lines caused by the same light emitting point) of the same scanning line in the sub-scanning direction at each main scanning must be n·P (the condition under which all of the scanning lines are scanned).

(2) Numbers indicated by h and n must be relatively prime (the condition under which repetitive scanning can be prevented).

In summary, the conditions under which interlaced scanning can be performed are the following Conditions 1 to 5 by the imaging magnification β and the interval γ among light emitting points in a direction perpendicular to the main scanning direction:

Condition 1: an integer satisfying n≧2

Condition 2: P=(β·γ)/h (where γ=β·γ which is derived from Equation (4))

Condition 3: an integer-satisfying h≧1 (when h=1, adjacent scanning is performed in place of interlaced scanning)

Condition 4: h and n are relatively prime

Condition 5: d=n·P

When Conditions 1 to 5 are satisfied, interlaced scanning can be performed.

A portion of the conditions about the number n of light emitting points and the interlaced period h which satisfy the foregoing Conditions 1 to 5 is shown in Table 1. Note that symbol A shown in Table 1 indicates the combination of the number n of light emitting points and the interlaced period h corresponding to the technique disclosed in Japanese Patent Examined Publication No. Hei. 1-45065, B indicates the combination of the number n of light emitting points and the interlaced period h corresponding to the technique disclosed in Japanese Patent Unexamined Publication No. Hei. 5-176128, C indicates the combination of the number n of light emitting points and the interlaced period h added by the technique disclosed in the foregoing thesis ("Multi-Beam Scanning Optics by a Laser Diode Array and Interlaced Scanning") and D indicates no combination.

As shown in Table 1, when n is determined, h which can be taken is discretely determined.

TABLE 1

| Interlaced Period h | Number n of Light Emitting Points | | | | | | | |
|---|---|---|---|---|---|---|---|---|
| | 2 | 3 | 4 | 5 | 6 | 7 | 8 | 9 |
| 2 | D | B | D | B | D | B | D | B |
| 3 | A | D | B | B | D | B | B | D |
| 4 | D | A | D | B | D | B | D | B |
| 5 | A | C | A | D | B | B | B | B |
| 6 | D | D | D | A | D | B | D | D |
| 7 | A | A | C | C | A | D | B | B |
| 8 | D | C | D | C | D | A | D | B |
| 9 | A | D | A | C | D | C | A | D |

However, the technique for simultaneously scanning a plurality of light beams suffers from the following problems.

That is, the above conventional technique is structured to perform interlaced scanning to solve the problem which arises owning to the adjacent scanning. Since a plurality of light emitting points are disposed straight at the same interval on the surface of one light emitting portion, the interval among the scanning lines which are simultaneously scanned is inevitably elongated. Therefore, a larger number of line buffer memories are required as compared with execution of the adjacent scanning. If the number n of light emitting points is 4 and the interlaced period h is 5, sixteen or more line buffer memories, which are four times the number of line buffer memories required for adjacent scanning, are required. The foregoing fact will now be described with reference to FIGS. 10(A) and 10(B). In FIGS. 10(A) and 10(B), a state of writing of scanning lines at each scanning is clarified by shifting the position at which writing is started to the right at each scanning using four light beams.

As shown in FIG. 10(A), all of light beams cannot be modulated at first scanning when interlaced scanning is performed. At first scanning, the position of a fourth scanning line is scanned by a fourth light emitting point in the sub-scanning direction. Second main scanning is performed such that third and fourth light emitting points in the sub-scanning direction scan the positions of third and eighth lines. When scanning is continued similarly, all of the four light emitting points are modulated at fourth scanning. At this time, the positions of first, sixth, eleventh and sixteenth scanning lines are simultaneously scanned. Therefore, the four light beams must simultaneously be modulated. At least data of modulation at the positions from the first line to the sixteenth line must be stored in the line buffer memories. Among stored data, data of modulation for four lines must be selected so as to be input to the light emitting portions.

On the other hand, adjacent-scanning permits all of the four light emitting points to be modulated from first scanning, as shown in FIG. 10(B). Therefore, the line buffer memory is required to store data of modulation for four lines.

The above conventional technique for simultaneously scanning a plurality of light beams must form all of light emitting points for simultaneously emitting light on a straight line on the surface of one light emitting portion. When the pitch of the scanning lines on the photosensitive member is required to be reduced, the interval among the light emitting points must be reduced. In this case, light emitting portions satisfying the requirement cannot easily be manufactured. That is, respective light emitting points must be provided with terminals through which electric power is supplied from a power source and which is formed by wire bonding or the like. If the interval among the light emitting points is too small, simple machining, including the wire bonding process, cannot be performed. Therefore, special machining must be performed.

SUMMARY OF THE INVENTION

To solve the above-mentioned problems, an object of the present invention is to provide an optical scanning apparatus which is capable of reducing the number of line buffer memories and which can easily be manufactured.

To achieve the above object, according to a first aspect of the invention, there is provided an optical scanning apparatus comprising: two light emitting portions each having a plurality of light emitting points each of which can independently be light-modulated and which are disposed in a predetermined direction; an optical system for imaging light beams emitted from the two light emitting portions on a surface of a photosensitive member; and a deflecting unit for simultaneously deflecting the light beams emitted from the two light emitting portions to a main scanning direction intersecting the predetermined direction so as to scan the surface of the photosensitive member, wherein the two light emitting portions are disposed such that intervals among scanning lines scanned by light beams emitted from adjacent light emitting points of one of the light emitting portions are scanned by a light beam emitted from at least one light emitting point of the other light emitting portion so as to perform interlaced scanning, and assuming that n is the total number of the light emitting points, m is the number of the light emitting points of each light emitting portion, P is an interval between adjacent scanning lines on the surface of the photosensitive member, $\beta$ is an imaging magnification in a direction perpendicular to the main scanning direction, $\gamma$ is an interval between the light emitting points on each light emitting portion, i is an interlaced period which is determined by the number of scanning lines which are interlaced by the same light emitting point at each sub-scanning, d1 is an interval between scanning lines on the surface of the photosensitive member which is scanned by the same light emitting point and d2 is an interval between scanning lines on the surface of the photosensitive member realized by a predetermined light emitting point of one of the light emitting portions and a light emitting point of the other light emitting portion corresponding to the predetermined light emitting point, the following conditions are satisfied: n is an even number satisfying $n \geq 4$, $n=2m$, $P=(\beta \cdot \gamma)/(2 \cdot i)$, i is an integer satisfying $i \geq 2$, i and m are relatively prime, $d1=nP$ and $d2=cP$ (where c is an odd number satisfying $1 \leq c$).

The optical scanning apparatus according to the first aspect causes light beams emitted from the two light emitting portions each having a plurality light emitting points which can independently be light-modulated and disposed in a predetermined direction to be imaged on the surface of the photosensitive member by the optical system. Moreover, light beams emitted from the two light emitting portions are simultaneously deflected by the deflecting unit in the main scanning direction intersecting the predetermined direction so that the surface of the photosensitive member is scanned. When the above scanning is performed, intervals among scanning lines scanned by light beams emitted from adjacent light emitting points of one of the light emitting portions are scanned by a light beam emitted from at least one light emitting point of the other light emitting portion so as to perform interlaced scanning.

The optical scanning apparatus according to the first aspect satisfies the conditions required in the first aspect.

In the first aspect, the plurality of light emitting points which have been provided for one light emitting portion in the conventional structure, are divided and provided for the two light emitting portions. Further, intervals among scanning lines scanned by light beams emitted from adjacent light emitting points of one of the light emitting portions are scanned by a light beam emitted from at least one light emitting point of the other light emitting portion so as to perform interlaced scanning. Furthermore, the two light emitting portions are disposed such that the interval of the scanning lines scanned by the two light emitting portions is reduced. Thus, the number of scanning lines disposed between a first scanning line and a final scanning line (an uppermost scanning line and a lowermost scanning line in the sub-scanning direction) when the surface of the photosensitive member is simultaneously scanned is reduced. As a result, the number of the line buffer memories is reduced.

The conditions required in the first aspect are obtained as follows by modifying conventional Conditions 1 to 5 which are the conditions under which interlaced scanning can be performed.

A consideration will be made about the conditions under which interlaced scanning can be performed and in which the interval d2 between scanning lines is P which is the shortest interval. Assuming that the conventional condition in which the position of one scanning line is scanned by two light beams emitted from different light emitting portions and positioned at the interval P, the above scanning equals to scanning which is performed such that scanning lines, the number of which is two times, scan an interval $\beta \cdot \gamma$ which is positioned between the scanning lines on the surface of the photosensitive member and which is scanned by light beams emitted from adjacent light emitting points of one light emitting portion. Therefore, Condition 2 is modified as follows:

Condition 12: $P=(\beta \cdot \gamma)/(2 \cdot i)$

Since each of the two light emitting portions has the plural light emitting points, the numbers of which are the same, n is an even number not smaller than 4. Thus, Condition 1 is modified to the following Condition 11.

Condition 11: an even number satisfying $n \geq 4$ and $n=2m$

The interlaced period i is as follows similarly to Condition 3 because adjacent scanning is not performed in this case.

Condition 13: an integer satisfying $i \geq 2$

The condition under which repetitive scanning is prevented is considered to be equal to the conventional condition that the position of one scanning line is scanned by two light beams. Therefore, the number m of the light emitting points and the interlaced period i must be relatively prime. Therefore, Condition 14 corresponding to Condition 4 is as follows:

Condition 14: i and m are relatively prime.

As for the interval d1 between scanning lines on the surface of the photosensitive member which is scanned by the same light emitting points, Condition 5 is employed as it is because a twice number of scanning lines are scanned by a twice number of light emitting points as compared with conventional scanning:

Condition 15: $d1 = n \cdot P$

The interval d2 between scanning lines realized by a predetermined light emitting point of one of the light emitting portions and a light emitting point corresponding to the predetermined light emitting point and included in the other light emitting portion has been considered to be P which is the shortest interval. If the scanning lines do not overlap with each other, the interval can be elongated to a value which is an integral multiple of P. The interval d1 between scanning lines is an even-numbered multiple of P because n is an even number. That is, the interval $(\gamma \cdot \gamma)$ between scanning lines formed by adjacent light emitting points in one light emitting portion is as follows because of Condition 12:

$$(\beta \cdot \gamma) = 2 \cdot i \cdot P$$

Since the above interval is an even-numbered multiple of P in either case, the interval d2 between scanning lines must be an odd-numbered multiple of P. Therefore, the following condition is held:

Condition 16: $d2 = cP$ (where c is an odd number satisfying $1 \leq c$)

As described above, the conditions required in the first aspect can be derived.

Further, according to a second aspect of the invention, there is provided an optical scanning apparatus having a structure according to the first aspect, wherein when d2 satisfies $d2 = cP$, c is an odd number satisfying $1 \leq c < i$.

A condition under which the number of the line buffer memories is smaller than that in usual interlaced scanning will now be considered. That is, an upper limit of d2 will now be considered.

The interval between scanning lines formed on the surface of the photosensitive member by adjacent light emitting points in one light emitting portion is $(\beta \cdot \gamma)$. Therefore, the interval must be shorter than half of the above-mentioned interval. Thus, the conventional equal interval among light emitting points in one light emitting portion is maintained, that is, the conventional easiness of manufacturing the light emitting portion is maintained. Moreover, the interval between the uppermost scanning line and the lowermost scanning line in the sub-scanning direction which can be scanned by one scanning operation can be reduced by increasing the number of the light emitting portions. As a result, the number of the line buffer memories can be reduced. Therefore, the relationship $d2 < (\beta \cdot \gamma)/2 = iP$ is satisfied. Thus, Condition 16 required in the first aspect is made to be as follows:

Condition 16': $d2 = cP$ (where c is an odd number satisfying $1 \leq c < i$)

A state of scanning on the photosensitive member of the optical scanning apparatus satisfying the conditions required in the first and second aspects and the structure of the light emitting portion of the same will now be described. FIGS. 1(A) to 1(C) show a state of scanning on the photosensitive member and the structure of the light emitting portion in a case where the total number n of the light emitting points is four. FIGS. 2(A) and 2(B) show a state of scanning on the photosensitive member and the structure of the light emitting portion in a case where the total number n of the light emitting points is six. In FIGS. 1(A) and 2(A), the position at which writing is started is shifted to the right at each main scanning to clearly illustrate a state of writing of scanning lines at each scanning.

When the total number n of the light emitting points is four, two (=n/2) light emitting points apart from each other for the interval $\gamma$ between light emitting points are provided for each light emitting portion 12, as shown in FIG. 1(B). Thus, two light beams emitted from the light emitting points scan positions apart from each other for the interval $(\beta \cdot \gamma)$ on the surface of the photosensitive member. In this case, as shown in FIG. 1(C), scanning is performed such that positions of scanning lines realized by two light beams 1-*a* and 1-*b* emitted from a light emitting portion 12A which is one of the light emitting portions and positions of scanning lines realized by two scanning lines 2-*a* and 2-*b* emitted from the other light emitting portion 12B are alternately arranged in the sub-scanning direction S. That is, scanning is performed such that light beams are downwards positioned in an order as 1-*a*, 2-*a*, 1-*b* and 2-*b* in the sub-scanning direction S.

In this case, various parameters can be determined to satisfy the conditions required in the first and second aspects.

Interlaced Period: $i = 3$
Interval Between Scanning Lines: $P = (\beta \cdot \gamma)/(2 \cdot i) = (\beta \cdot \gamma)/6$
Interval Between Scanning Lines: $d1 = nP = 4P$
Interval Between Scanning lines: $d2 = cP = P$ (when $c = 1$)

When the various parameters have been set as described above, scanning is performed as shown in FIG. 1(A). That is, light beams emitted from the light emitting portions 12A and 12B are used to perform first main scanning in a direction indicated with an arrow M shown in FIG. 1(A). At this time, the interval d2 between scanning lines is P. Then, the photosensitive member is moved for a distance corresponding to the interval d1 (=4P) between scanning lines in a direction indicated with an arrow S shown in FIG. 1(A) so that sub-scanning is performed. The above-mentioned main and sub-scanning are repeated so that all of the scanning lines are scanned without any repetition.

When the total number n of light emitting points is six, three (=n/2) light emitting points apart from one another for interval $\gamma$ are provided for each of the light emitting portions 12C and 12D, as shown in FIGS. 2(A) and 2(B). Three light beams emitted from each light emitting point are used to scan points apart from each other for $\beta \cdot \gamma$ on the surface of the photosensitive member. In this case, as shown in FIG. 2(B), scanning is performed such that the positions of scanning lines realized by three light beams 1-*a*, 1-*b* and 1-*c* emitted from one light emitting portion 12C and the positions of scanning lines realized by three light beams 2-*a*, 2-*b* and 2-*c* emitted from the other light emitting portion 12D are alternately arranged in the sub-scanning direction S. That is, scanning is performed such that light beams are downwards arranged in an order as 1-*a*, 2-*a*, 1-*b*, 2-*b*, 1-*c* and 2-*c* in the sub-scanning direction S.

In this case, various parameters can be determined to satisfy the conditions required in the first and second aspects.

Interlaced Period: $i = 5$
Interval Between Scanning Lines: $P = (\beta \cdot \gamma)/(2 \cdot i) = (\beta \cdot \gamma)/10$
Interval Between Scanning Lines: $d1 = nP = 6P$
Interval Between Scanning lines: $d2 = cP = P$ (when $c = 1$)

When the various parameters have been set as described above, scanning is performed as shown in FIG. 2(A). That is, light beams emitted from the light emitting portions 12C and 12D are used to perform first main scanning in a direction indicated with an arrow M shown in FIG. 2(A). At this time, the interval d2 between scanning lines is P. Then, the photosensitive member is moved for a distance corresponding to the interval d1 (=6P) between scanning lines in a direction indicated with an arrow S shown in FIG. 2(A) so that sub-scanning is performed. The above-mentioned main and sub-scanning are repeated so that all of the scanning lines are scanned without any repetition.

In table 2, symbol A shows a portion of combinations of the total number n of light emitting points and the interlaced period i which satisfy the conditions under which interlaced scanning is performed by the optical scanning apparatus according to the first and second aspects. Note that symbol D shows no combination.

As shown in Table 2, when the total number n of light emitting points is 4, the interlaced period i may be 3, 5, 7 or the like. When the total number n of light emitting points is 6, the interlaced period i may be 2, 4, 5 or the like. As described above, when the total number n of light emitting points is determined, the interlaced period i which can be employed is discretely determined.

TABLE 2

| Interlaced | Total Number n of Light Emitting Points | | | | | | | |
|---|---|---|---|---|---|---|---|---|
| Period i | 4 | 6 | 8 | 10 | 12 | 14 | 16 | 18 |
| 2 | D | A | D | A | D | A | D | A |
| 3 | A | D | A | A | D | A | A | D |
| 4 | D | A | D | A | D | A | D | A |
| 5 | A | A | A | D | A | A | A | A |
| 6 | D | D | D | A | D | A | D | D |
| 7 | A | A | A | A | A | D | A | A |
| 8 | D | A | D | A | D | A | D | A |
| 9 | A | D | A | A | D | A | A | D |

Table 3 shows a portion of a state of reduction in the number of line buffer memories of the optical scanning apparatus according to the first and second aspects. As shown in Table 3, a consideration is made about the conventional interlaced scanning and the interlaced scanning required in the first and second aspects in a case where the interval P between scanning lines is the same, the interval $\gamma$ between the light emitting points is the same and the imaging magnification $\beta$ is substantially the same. When the number n of light emitting points is 4, the interlaced period h (interval P between scanning lines $=(\beta\cdot\gamma)/5$) is 5, the conventional interlaced scanning requires 16 line buffer memories. On the other hand, when c=1, the total number n of light emitting points is 4 and the interlaced period i is 3 (interval P between scanning lines=$(\beta\cdot\gamma)/6$), the first and second aspects require only eight line buffer memories.

A comparison is made between the conventional interlaced scanning which is performed such that the total number n of light emitting points is 4 and the interlaced period h is 3 (interval P between scanning lines=$(\beta\cdot\gamma)/3$) and the first and second aspects in which c=1, the total number n of light emitting points is 4 and the interlaced period i is 3 (interval P between scanning lines=$(\beta\cdot\gamma)/6$) (eight line buffer memories are required in this case). Even if the density of scanning is halved or the imaging magnification is halved, ten or more line buffer memories are required. That is, a state is considered in which the interlaced period h in conventional interlaced scanning and the interlaced period i in the interlaced scanning according to the first and second aspects are the same or close to each other (for example, when n=4 and h=i=3). If a required interval P between scanning lines is determined and the interval $\gamma$ between light emitting points is the same, interlaced scanning according to the first and second aspects is able to make the imaging magnification $\beta$ to be about two times (when n=4 and h=i=3, two times) as compared with the conventional interlaced scanning. Moreover, the number of the line buffer memories can be reduced from ten to eight.

TABLE 3

| | Interlaced Period i According to Present Invention | Number of Line Buffers Conventional → Present Invention Total Number n of Light Emitting Points (c = 1) | |
|---|---|---|---|
| Conventional Interlaced Period h | | 4 | 6 |
| 5 | 2 | x | 26 → 10 |
| 3 | 3 | 10 → 8 | x |
| 7 | 4 | x | 36 → 18 |
| 5 | 5 | 15 → 12 | 26 → 22 |

As shown in Table 3, the number LNO of line buffer memories required for conventional interlaced scanning is such that LNO=(n−1)×h+1 when the total number of light emitting points is n and the interlaced period is h. On the other hand, the number LN of line buffer memories required in the first and second aspects can be obtained such that LN=(n/2−1)×2i+2 when the total number of light emitting points is n and the interlaced period is i.

As described above, the optical scanning apparatus according to the first and second aspects has the structure that the number of the light emitting-portions is two. Moreover, the two light emitting portions are disposed such that intervals among scanning lines scanned by light beams emitted from adjacent light emitting points of one of the light emitting portions are scanned by a light beam emitted from at least one light emitting point of the other light emitting portion. Thus, the interval is shortened which is the interval between the first scanning line and the final scanning line (the uppermost scanning line and the lowermost scanning line in the sub-scanning direction) when the surface of the photosensitive member is simultaneously scanned. Therefore, the number of the line buffer memories can be reduced. The optical scanning apparatus according to the first and second aspects enables light emitting points arranged to simultaneously emit light can be divided to the two light emitting portions. Therefore, the light emitting portions can easily be manufactured as compared with a structure in which all of light emitting points are formed in one light emitting portion.

Further, according to a third aspect of the invention, there is provided an optical scanning apparatus comprising: a plurality of light emitting portions each having a plurality of light emitting points each of which can independently be light-modulated and which are disposed in a predetermined direction; an optical system for imaging light beams emitted from the plurality of light emitting portions on a surface of a photosensitive member; and a deflecting unit for simultaneously deflecting the light beams emitted from the plurality of light emitting portions to a main scanning direction intersecting the predetermined direction so as to scan the surface of the photosensitive member, wherein the plurality of light emitting portions are disposed such that intervals among scanning lines scanned by light beams emitted from adjacent light emitting points of each of the plurality of light emitting portions are mutually scanned so as to perform interlaced scanning, and assuming that n is the total number of the light emitting points, m is the number of the light emitting points of each light emitting portion, L is the number of the light emitting portions, P is an interval between adjacent scanning lines on the surface of the photosensitive member, β is an imaging magnification in a direction perpendicular to the main scanning direction, γ is an interval between the light emitting points on each light emitting portion, d1 is an interval between scanning lines on the surface of the photosensitive member which is scanned by the same light emitting point and d2 is an interval between scanning lines on the surface of the photosensitive member realized by a predetermined light emitting point of an α-th light emitting portion and a light emitting point of an (α+1)-th light emitting portion corresponding to the predetermined light emitting point, the following conditions are satisfied: m≦2, L≦2, n=mL, $P=(\beta\cdot\gamma)/L$, d1=nP, d2=P and (L−1)≦α≦1 (where α is an integer).

The optical scanning apparatus according to the third aspect has the structure that light beams emitted from a plurality of light emitting portions each having a plurality of light emitting points each of which can independently be light-modulated and which are disposed in a predetermined direction are imaged on the surface of the photosensitive member by the optical system. Moreover, the light beams emitted from the plural light emitting portions are simultaneously deflected in the main scanning direction intersecting the predetermined direction by the deflecting unit so that the surface of the photosensitive member is scanned. When the above scanning is performed, the portions among the scanning lines which are scanned by the light beams emitted from adjacent light emitting points of the plural light emitting portions are alternately scanned. Moreover, interlaced scanning is performed.

The optical scanning apparatus according to the third aspect satisfies the conditions required in the third aspect.

The optical scanning apparatus according to the third aspect is arranged to apparently perform adjacent scanning by using light beams emitted from the plural light emitting points of the plural light emitting portions.

Relationships among positions of light beams emitted from the light emitting portions are shown in the following drawings. FIG. 3(A) shows a case in which the number m of light emitting points is 2, the number L of light emitting portions is 2 and the total number n of light emitting points is 4 (=mL). FIG. 3(B) shows a case in which the number m of light emitting points is 3, the number L of light emitting portions is 3 and the total number n of light emitting points is 9. FIG. 3(C) shows a case in which the number m of light emitting points is 3, the number L of light emitting portions is 2 and the total number n of light emitting points is 6. As shown in FIGS. 3(A) to 3(C), the optical scanning apparatus according to the third aspect is structured to perform scanning such that positions of adjacent scanning lines are thoroughly scanned at each main scanning. Therefore, the number of line buffer memories required to perform interlaced scanning can be reduced to a number required when adjacent scanning is performed.

As described above, the third aspect is arranged to perform scanning such that omission of adjacent scanning lines is prevented in each scanning. Therefore, the interval β·γ (see FIG. 3(C)) on the surface of the photosensitive member which is simultaneously scanned by adjacent light emitting points of one light emitting portion must be filled with light beams emitted from light emitting points of different light emitting portions at the pitch of the pitch P among scanning lines. Therefore, the pitch P among scanning lines must inevitably satisfy the following relationship:

$P=(\beta\cdot\gamma)/L$

The interval d1 among scanning lines can be derived from Condition 1. Moreover, m, L, d2 and α can be derived from the preconditions.

As described above, the optical scanning apparatus according to the third aspect is structured such that a plurality of the light emitting portions are provided and scanning similar to adjacent scanning is performed. Therefore, the number of the line buffer memories can be reduced to the number required when adjacent scanning is performed.

Furthermore, according to a fourth aspect of the invention, there is provided an optical scanning apparatus comprising: two light emitting portions each having a plurality of light emitting points each of which can independently be light-modulated and which are disposed in a predetermined direction; an optical system for imaging light beams emitted from the two light emitting portions on a surface of a photosensitive member; and a deflecting unit for simultaneously deflecting the light beams emitted from the two light emitting portions to a main scanning direction intersecting the predetermined direction so as to scan the surface of the photosensitive member, wherein the two light emitting portions are disposed such that intervals among scanning lines scanned by light beams emitted from adjacent light emitting points of one of the light emitting portions are scanned by a light beam emitted from at least one light emitting point of the other light emitting portion so as to perform interlaced scanning, and assuming that n is the total number of the light emitting points, m is the number of the light emitting points of each light emitting portion, P is an interval between adjacent scanning lines on the surface of the photosensitive member, β is an imaging magnification in a direction perpendicular to the main scanning direction, γ is an interval between the light emitting points on each light emitting portion, d1 is an interval between scanning lines on the surface of the photosensitive member which is scanned by the same light emitting point and d2 is an interval between scanning lines on the surface of the photosensitive member realized by a predetermined light emitting point of one of the light emitting portions and a light emitting point of the other light emitting portion corresponding to the predetermined light emitting point, the following conditions are satisfied: n is an even number satisfying n≧4, n=2m, $P=(\beta\cdot\gamma)/(an+2)$ (where a is an integer satisfying a≧1), d1=nP and d2=bP (where b is an odd number satisfying 1≦b<an+2).

The optical scanning apparatus according to the fourth aspect has the structure that light beams emitted from two light emitting portions each having a plurality of light emitting points each of which can independently be light-modulated and which are disposed in a predetermined direction are imaged on the surface of the photosensitive member by the optical system. Moreover, the light beams emitted from the two light emitting portions are simultaneously deflected in the main scanning direction intersecting the predetermined direction by the deflecting unit so that the surface of the photosensitive member is scanned. When the above scanning is performed, the portions among the scanning lines which are scanned by the light beams emitted from adjacent light emitting points of one light emitting portion are scanned by a light beam emitted from at least one light emitting point of the other light emitting portion. Moreover, interlaced scanning is performed.

The optical scanning apparatus according to the fourth aspect satisfies the conditions required in the fourth aspect.

The fourth aspect has a structure that the plurality of light emitting points which have been provided for one light emitting portion in the conventional structure, are divided and provided for the two light emitting portions. Further, the two light emitting portions are disposed such that the interval of the scanning lines scanned by the light beams emitted from the adjacent light emitting points of one light emitting portion is scanned by a light beam emitted from at least one light emitting point of the other light emitting portion. Furthermore, the two light emitting portions are disposed such that the interval of the scanning lines scanned by the two light emitting portions is reduced. Thus, the number of scanning lines disposed between a first scanning line and a final scanning line (an uppermost scanning line and a lowermost scanning line in the sub-scanning direction) when the surface of the photosensitive member is simultaneously scanned is reduced. As a result, the number of the line buffer memories is reduced.

The conditions required in the fourth aspect are obtained as follows by modifying the conditions which has been disclosed in Japanese Patent Examined Publication No. Hei. 1-45065 and under which interlaced scanning can be performed.

A consideration will be made about the condition under which interlaced scanning can be performed and in which the interval d2 between scanning lines is P which is the shortest interval. A consideration of Equation (1) disclosed in Japanese Patent Examined Publication No. Hei. 1-45065 is made such that one position of a scanning line is scanned by two light beams emitted from different light emitting portions at an interval of P. The above scanning equals to scanning which is performed such that scanning lines, the number of which is two times, scan an interval $\beta \cdot \gamma$ which is positioned between the scanning lines on the surface of the photosensitive member and which is scanned by light beams emitted from adjacent light emitting points of one light emitting portion. Therefore, Equation (1) can be deformed as follows:

$$P=(\beta \cdot \gamma)/2(xn+1)=(\beta \cdot \gamma)/(2xn+2)$$

When a is substituted for 2x, the following relationship is satisfied:

$$P=(\beta \cdot \gamma)/(an+2).$$

Since each of the two light-emitting portions has the plural light emitting points, the numbers of which are the same, n is an even number not smaller than 4. At this time, a minimum value of (2xn+2) is six because the minimum value is twice as a minimum value (x=1, n=2) disclosed in Japanese Patent Examined Publication No. Hei. 1-45065. Therefore, since the minimum total number n of light emitting points is four, the relationship 4a+2≧6 is satisfied. Thus, a fact can be recognized that the relationship a ≧1 must be satisfied.

The interval d1 between scanning lines on the surface of the photosensitive member which is scanned by the same light emitting point is even-numbered times of P because the relationship d1=nP is satisfied in Condition 1.

Moreover, the interval d2 between scanning lines on the surface of the photosensitive member realized by a predetermined light emitting point of one of the light emitting portions and the light emitting point corresponding to the predetermined light emitting point and included in the other light emitting portion must be P or longer. The longest distance d2 must be an interval shorter than (an+2) with which overlap with a scanning line realized by a next light emitting point to the predetermined light emitting point in the other light emitting portion can be prevented. Since the interval d1 between scanning lines is even-numbered times P, the interval d1 must be odd-numbered times P to prevent overlap. Thus, the conditions required in the fourth aspect have been derived.

As described above, the optical scanning apparatus according to the fourth aspect has the structure that the number of the light emitting portions is made to be two. Moreover, the two light emitting portions are disposed such that the portion between scanning lines which is scanned by light beams emitted from adjacent light emitting points of one light emitting portion is scanned by a light beam emitted from at least one light emitting point of the other light emitting portion. Therefore, the distance between the first and final scanning lines (the uppermost scanning line and the lowermost scanning line in the sub-scanning direction) when the surface of the relationship is simultaneously scanned can be reduced. Thus, the number of the line buffer memories can be reduced.

BRIEF DESCRIPTION OF THE DRAWINGS

FIG. 1(A) is a plan view showing a state of scanning on the surface of a photosensitive member; FIG. 1(B) is a schematic view showing the structure of each light emitting portion and the distance, on the surface of the photosensitive member, between two light beams emitted from light emitting points of the light emitting portions; and FIG. 1(C) is a schematic view showing the relative positions of light beams emitted from two light emitting portions.

FIG. 2(A) is a plan view showing a state of scanning on the surface of the photosensitive member; and FIG. 2(B) is a schematic view showing relative positions of light beams emitted from two light emitting portions.

FIG. 3(A) is a schematic view showing the relative positions of light beams emitted from each light emitting portion when the number L of the light emitting portions is 2 and the total number n of the light emitting points is 4; FIG. 3(B) is a schematic view showing the relative positions of light beams emitted from each light emitting portion when the number L of light emitting portions is 3 and the total number n of light emitting points is 9; and FIG. 3(C) is a schematic view showing the relative positions of light beams emitted from each light emitting portion when the number L of the light emitting portion is 2 and the total number n of light emitting points is 6.

FIG. 10(A) is a schematic view showing conventional interlaced scanning; and FIG. 10(B) is a schematic view showing a state of conventional adjacent scanning.

DETAILED DESCRIPTION OF THE PREFERRED EMBODIMENTS

Figure 1:
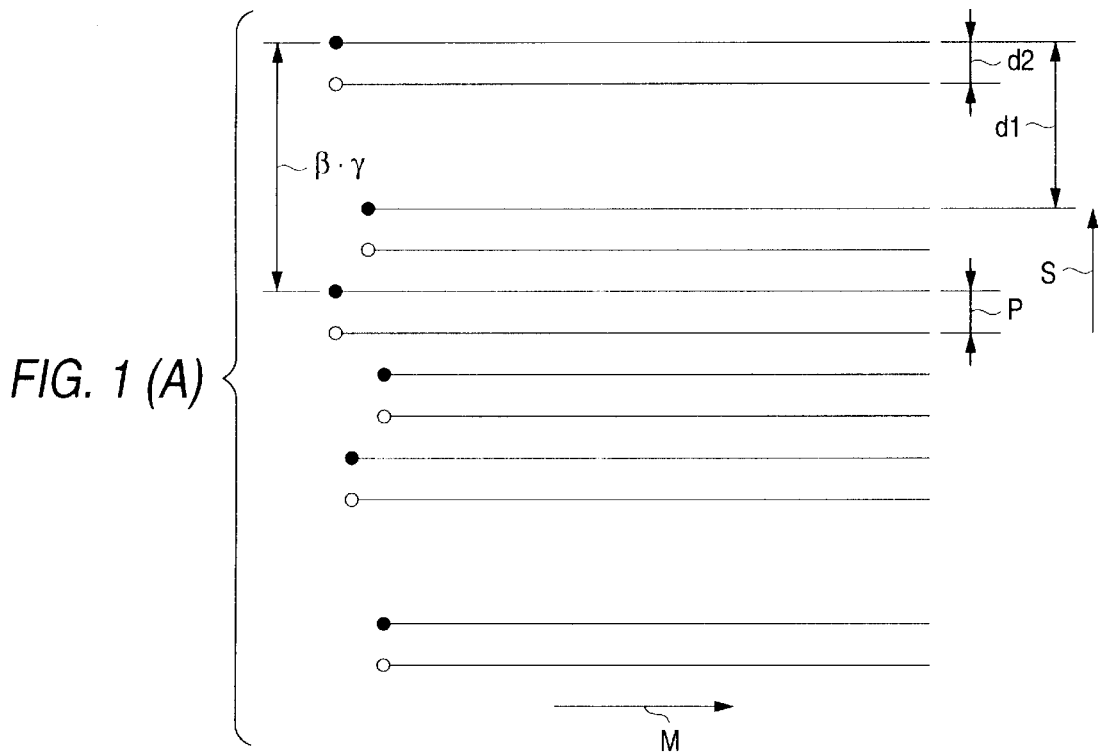
FIGS.1(A) to 1(C) diagrams showing the first and second aspects of the invention when the total number n of light emitting points is 4.
Figure 1:
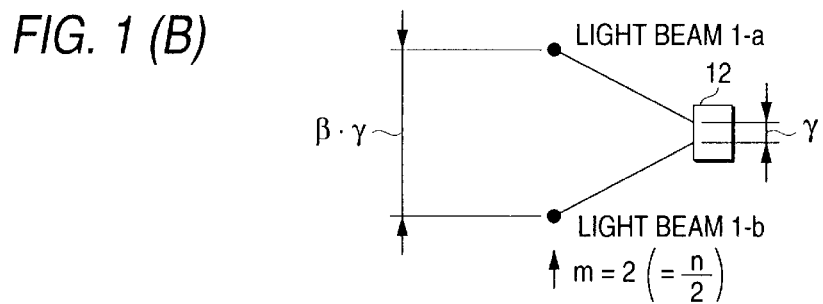
Figure 1:
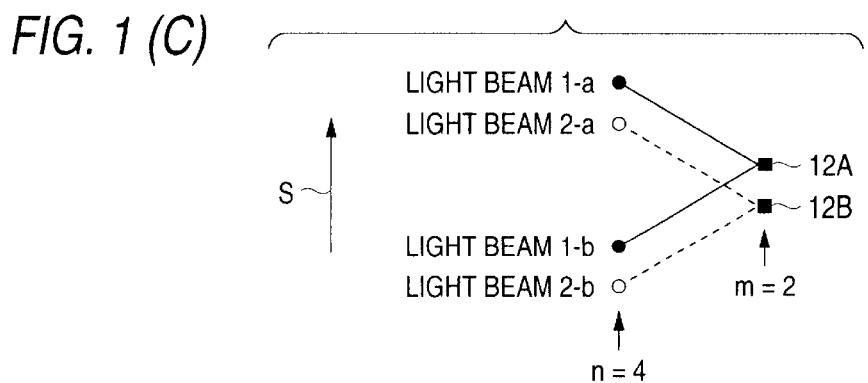
Figure 2:
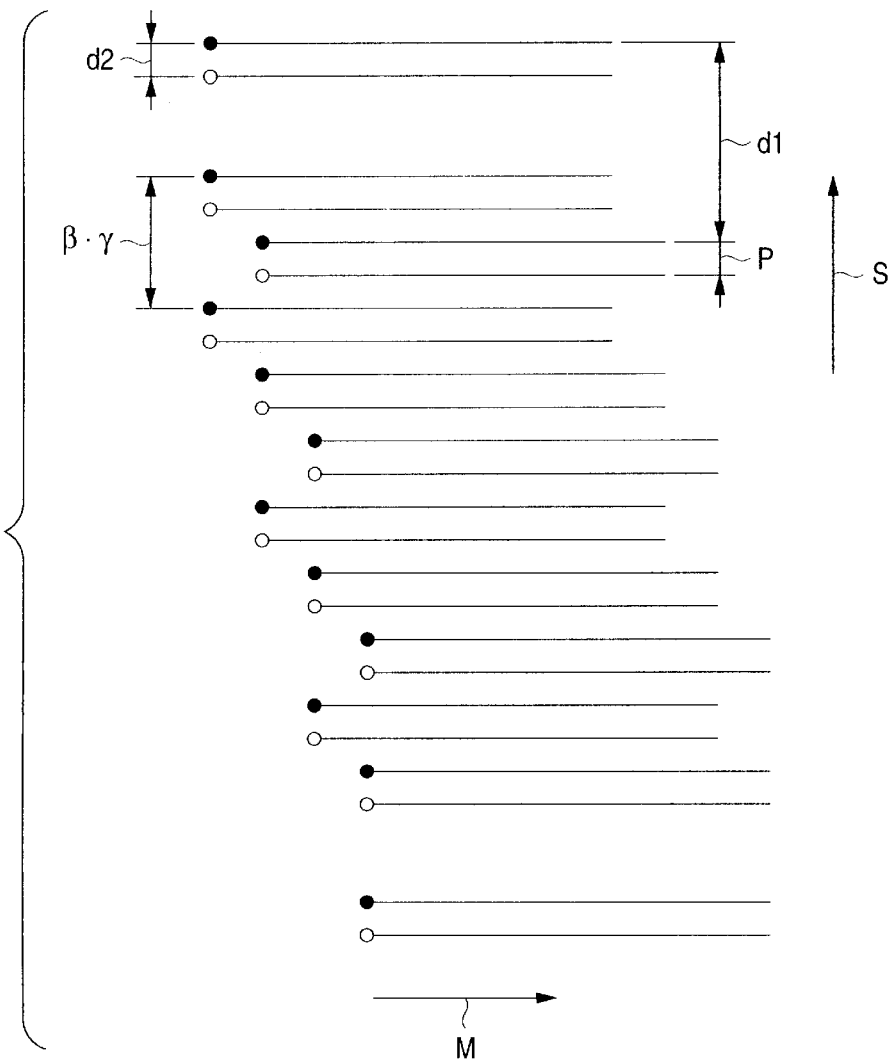
FIGS. 2(a) and 2(B) are diagrams showing the first and second aspects of the invention when the total number n of light emitting points is 6.
Figure 2:
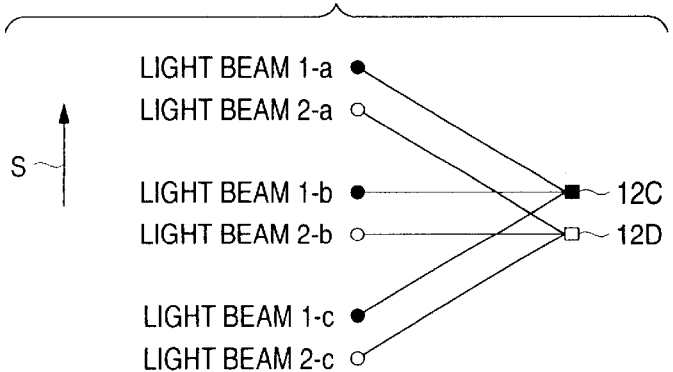
Figure 3:
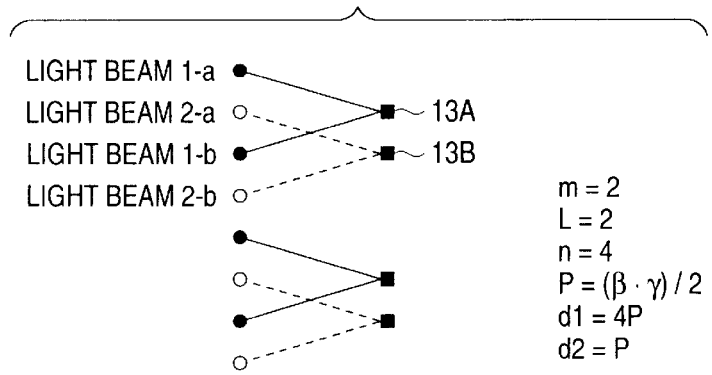
FIGS. 3(A) to 3(C) are diagrams showing the third aspect of the invention.
Figure 3:
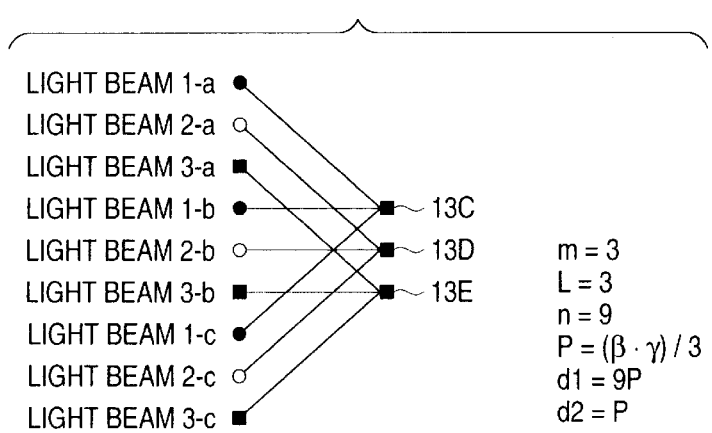
Figure 3:
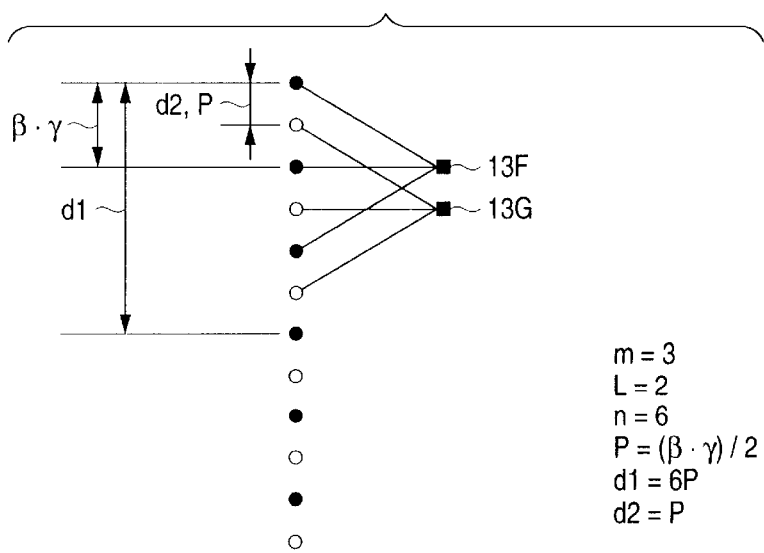

Referring to the drawings, embodiments of the present invention will now be described.

[First Embodiment]

An embodiment of the optical scanning apparatus according to the first and second aspects of the invention will now be described with reference to FIGS. 4 to 6.

Figure 4:
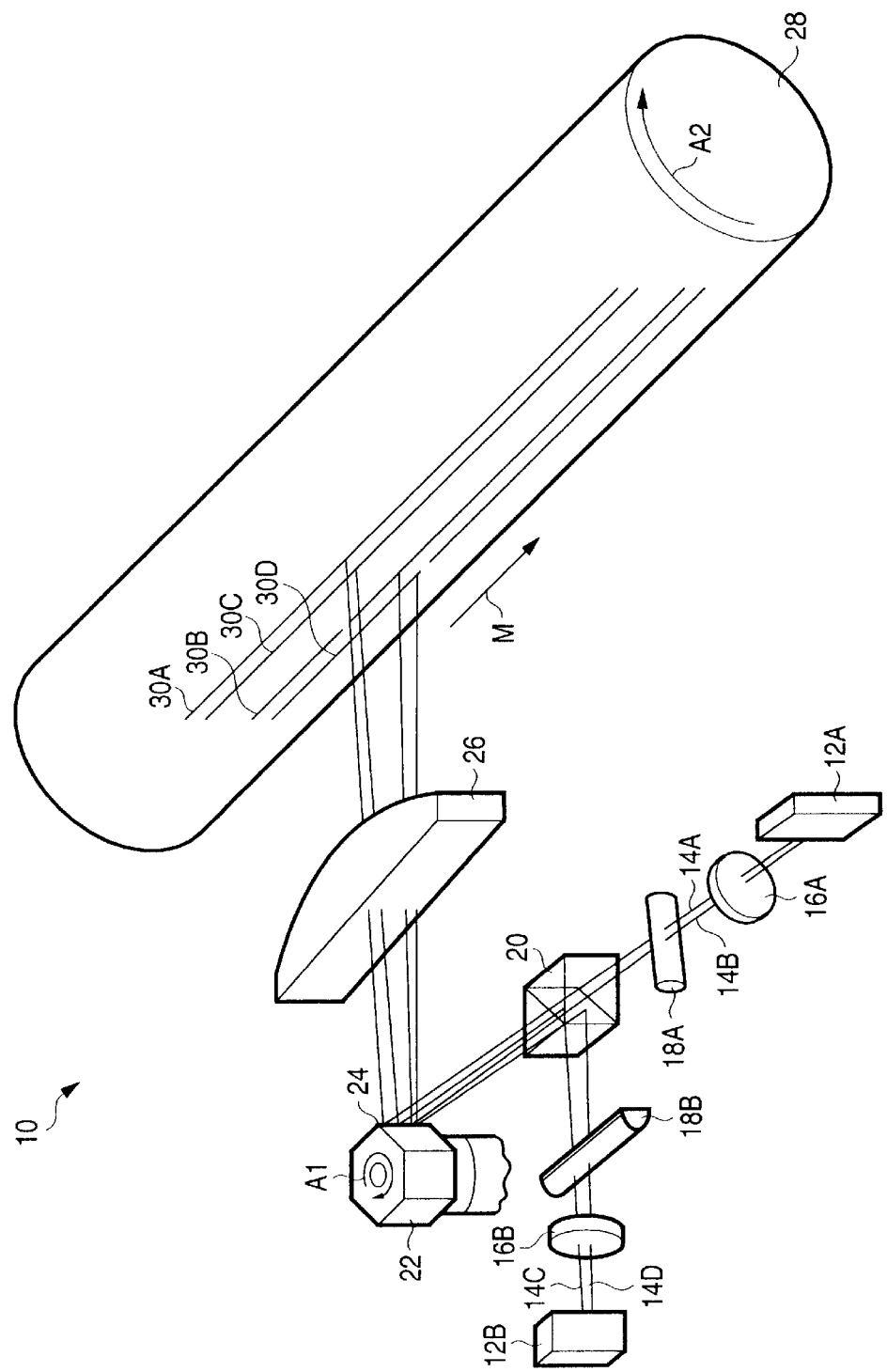
FIG. 4 is a perspective view showing the schematic structure of an optical scanning apparatus according to first and third embodiments.

As shown in FIG. 4, an optical scanning apparatus 10 according to the first embodiment incorporates two light emitting portions 12A and 12B each having two light emitting points. The light emitting portion 12A is able to simultaneously emit two light beams which are a light beam 14A and a light beam 14B. The light emitting portion 12B is able to simultaneously emit two light beams which are a light beam 14C and a light beam 14D. Therefore, in the first embodiment, the total number n of the light emitting points is 4 and the number m of light emitting points in each light emitting portion is 2.

In a downstream direction in which light beams are emitted from the light emitting portion 12A and the light emitting portion 12B, there are sequentially disposed collimator lenses 16A and 16B for causing light beams to be parallel beams and cylindrical lenses 18A and 18B for correcting inclinations of the planes. Moreover, a beam splitter 20 for synthesizing incidental light beams so as to emit the synthesized light beam to a mirror surface 24 of a polygonal mirror 22 to be described later is disposed at a further downstream position through which each light beam is able to pass. Note that the beam splitter 20 synthesizes the incidental light beams 14A to 14D such that the light beams are downwards positioned in an order as 14A, 14C, 14B and 14D in the sub-scanning direction. That is, the two light beams emitted from each of the two light emitting portions 12A and 12B are alternately positioned in the sub-scanning direction.

The polygonal mirror 22 is disposed in a direction of emission of the light beam from the beam splitter 20. The polygonal mirror 22 is able to rotate in a direction indicated with an arrow A1 shown in FIG. 4. When the rotation is performed, main scanning using the light beam made incident upon the mirror surface 24 is performed.

An imaging lens 26 is disposed in a direction in which the light beam is reflected by the mirror surface 24 of the polygonal mirror 22. In a direction in which the light beam is emitted from the imaging lens 26, a drum-shaped photosensitive member 28 is disposed. The photosensitive member 28 is able to rotate in a direction indicated with an arrow A2 shown in FIG. 4. When the rotation is performed, sub-scanning is performed.

Figure 5:
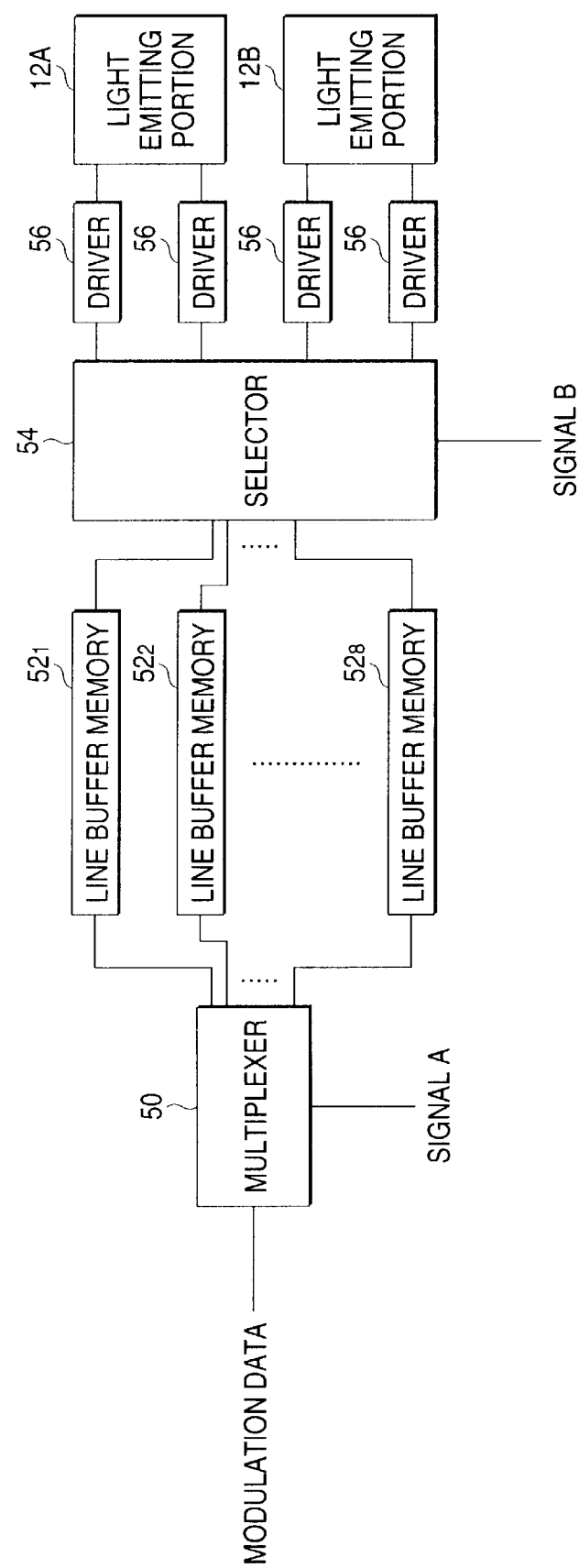
FIG. 5 is a block diagram showing line buffer memories of the optical scanning apparatus according to the first and third embodiments and its peripheral units.

As shown in FIG. 5, the optical scanning apparatus 10 according to the first embodiment has eight line buffer memories $52_1$ to $52_8$ for sequentially storing modulation data which is supplied to the light emitting portions 12A and 12B when interlaced scanning is performed. Each input terminal of the line buffer memories $52_1$ to $52_8$ is connected to a 1-input and 8-output multiplexer 50 to which modulation data is serially input which corresponds to image data which must be recorded on the photosensitive member 28 when scanning and exposure are performed.

Each output terminal of the line buffer memories $52_1$ to $52_8$ is connected to an input terminal of an 8-input and 4-output selector 54. The four output terminals of the selector 54 are, through a corresponding driver 56, connected to light emitting points provided for the light emitting portions 12A and 12B.

In response to signal A, the multiplexer 50 distributes and stores modulation data for each line, which has been serially input, in each of the line buffer memories $52_1$ to $52_8$. In response to signal B, the selector 54 selects, from modulation data for 8 lines stored in each of the line buffer memories $52_1$ to $52_8$, modulation data for four lines corresponding to the lines required to simultaneously be recorded on the photosensitive member 28, and then outputs the selected modulation data.

When the line buffer memories and their peripheral units are structured as described above, modulation data for four lines can be selected from modulation data for 8 lines so as to be supplied to the light emitting portions 12A and 12B.

The optical scanning apparatus 10 according to the first embodiment has the structure that the number of the line buffer memories is minimized by making the interlaced period i to be 3 (a minimum value which is relatively prime with the number m (=2) of light emitting points in each light emitting portion) and the value of c to be 1. The conditions required for the optical scanning apparatus 10 according to the first embodiment are as follows.

Total Number of Light Emitting Points: n=4

Number m of Light Emitting Points in Each Light Emitting Portion: m=2

Interval P Between Scanning Lines: $(\beta \cdot \gamma)/(2 \cdot i)=(\beta \cdot \gamma)/6$ Interlaced Period: i=3

Interval Between Scanning Lines: d1=nP=4P

Interval Between Scanning lines: d2=cP=P

In the optical scanning apparatus 10 structured as described above, rotation of the polygonal mirror 22 at a predetermined speed in the direction indicated with the arrow A1 shown in FIG. 4 is started. Then, emission of light beams 14A and 14B from the two light emitting points of the light emitting portion 12A is started. The light beams 14A and 14B are allowed to sequentially pass through the collimator lens 16A and the cylindrical lens 18A so as to be made incident upon the beam splitter 20. Simultaneously with start of emission of the light beams 14A and 14B from the light emitting portion 12A, emission of light beams 14C and 14D from the two light emitting points of the light emitting portion 12B is started. The light beams 14C and 14D are allowed to sequentially pass through the collimator lens 16B and the cylindrical lens 18B so as to be made incident on the beam splitter 20.

The beam splitter 20 synthesizes and emits, to the mirror surface 24 of the polygonal mirror 22, the incident light beams 14A, 14B, 14C and 14D. When the polygonal mirror 22 is rotated in the direction indicated with the arrow A1 shown in FIG. 4, the incident angle of each of the light beams 14A to 14D made from the mirror surface 24 of the polygonal mirror 22 is changed. Thus, the light beams 14A to 14D are deflected in a direction indicated with an arrow M shown in FIG. 4. The deflected light beams 14A to 14D scan (main-scan) the surface of the photosensitive member 28 through the imaging lens 26. In FIG. 4, reference numerals 30A to 30D designate positions of scanning lines on the surface of the photosensitive member 28 which is scanned by the light beams 14A to 14D.

After main scanning has been completed, the photosensitive member 28 is rotated (sub-scanned) in the direction indicated with the arrow A2 shown in FIG. 4 so that the surface of the photosensitive member 28 is moved for a distance d1 between scanning lines (=4P).

Then, the foregoing operations, that is, main scanning and sub-scanning are repeated so that a latent image of an image for one page which must be recorded is recorded on the surface of the photosensitive member 28.

Figure 6:
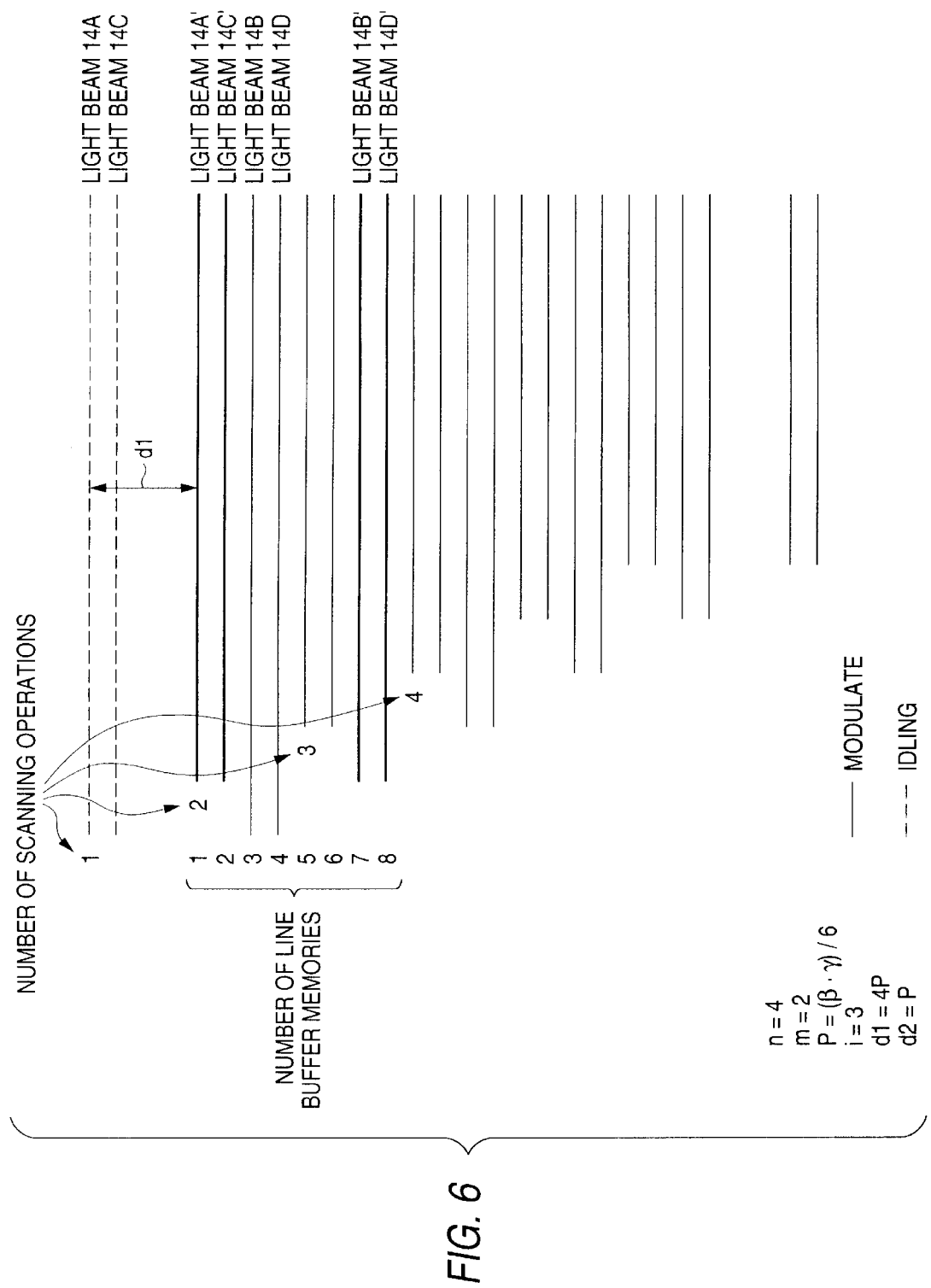
FIG. 6 is schematic view showing a state of scanning on the surface of the photosensitive member performed by the optical scanning apparatus according to the first and third embodiments.

FIG. 6 shows a state of interlaced scanning on the surface of the photosensitive member 28 which is performed by the above-mentioned operations. To clearly illustrate a state of writing of the scanning lines at each scanning, FIG. 6 shows a state in which the position at which writing is started is shifted to the right at each scanning using the four light beams.

As shown in the drawing, first main scanning of third and fourth lines is performed by using the light beams 14B and 14D. At this time, control is performed such that the light beams 14A and 14C are made to be idling.

Then, the photosensitive member 28 is rotated such that the surface of the photosensitive member 28 is moved for the interval d1 (=4P) between scanning lines. Then, second main scanning is performed so that first and second lines are scanned by light beams 14A' and 14C'. Simultaneously, seventh and eighth lines are scanned by light beams 14B' and 14D'. As described above, the optical scanning apparatus 10 according to the first embodiment starts scanning using all of the light beams at this moment of time (at second main scanning).

Figure 10:
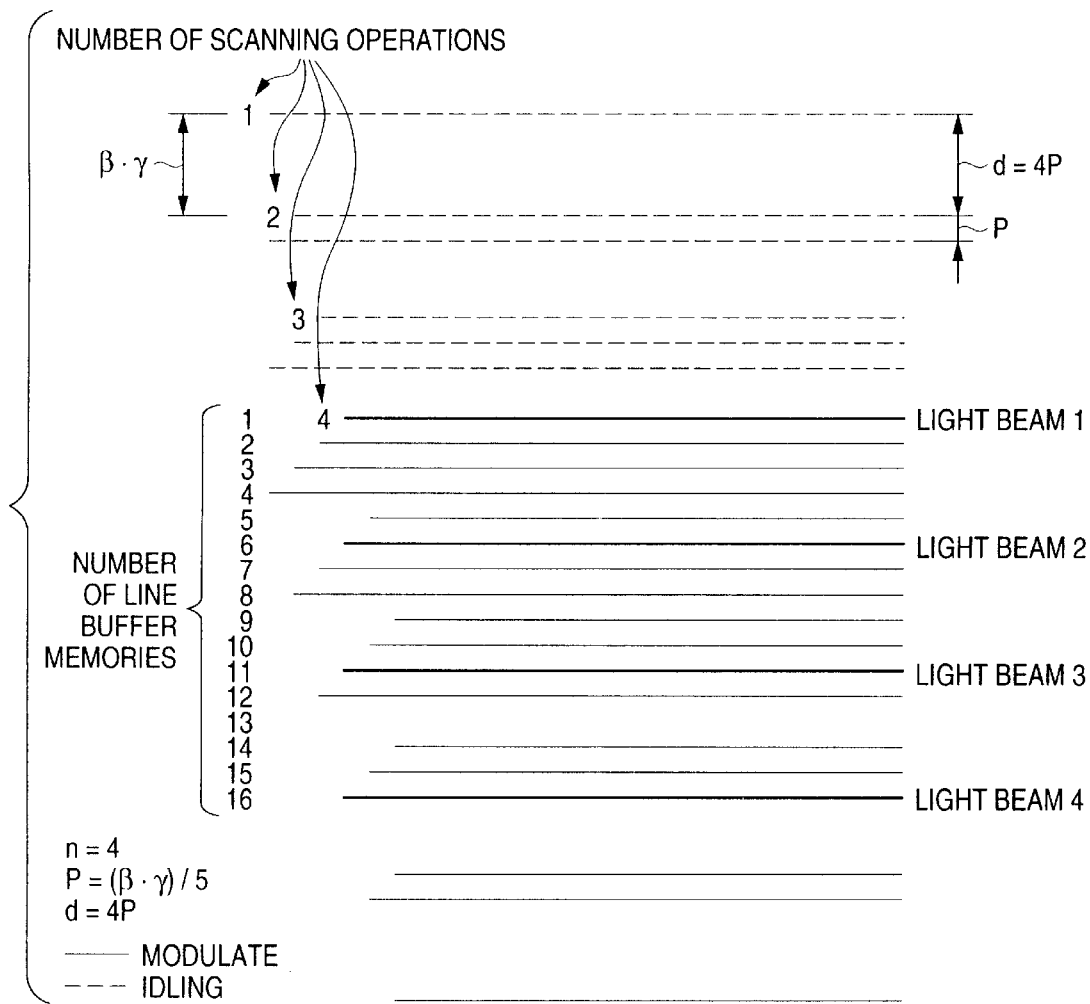
FIGS. 10(A) and 10(B) are diagrams showing problems experienced with the conventional optical scanning apparatus.
Figure 10:
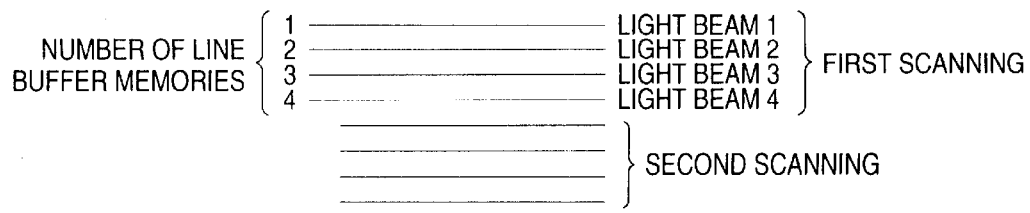
Figure 11:
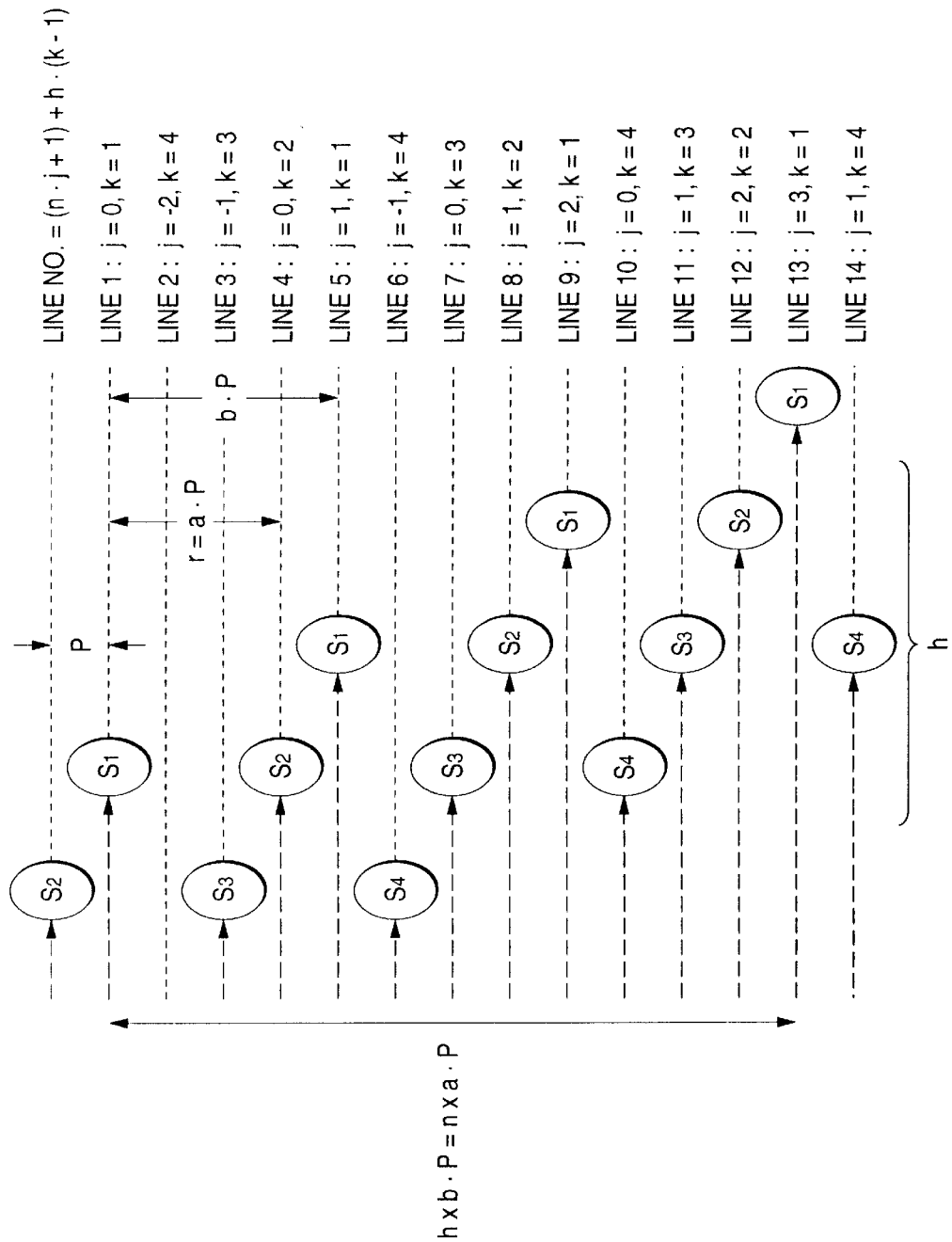
FIG. 11 is a diagram showing conditions under which conventional interlaced scanning can be performed and a state of interlaced scanning on the surface of the photosensitive member.

The above-mentioned operations are repeated so that the surface of the photosensitive member 28 is scanned at a predetermined scanning density without any repetition. At this time, as shown in FIG. 6, the number of required line buffer memories is eight (for eight lines) which is half of the number (sixteen) required when the conventional interlaced scanning shown in FIG. 10 is performed. Since the interval P between scanning lines is $(\beta\cdot\gamma)/6$, the imaging magnification $\beta$ can be enlarged to 6/5 times (=1.2 times) as compared with the case in which the conventional interlaced scanning $(P=(\beta\cdot\gamma)/5)$ shown in FIG. 10 is performed.

As described above, the optical scanning apparatus 10 according to the first embodiment has the structure that the number of the light emitting portions is two so that the interval between the first scanning line and the final scanning line (the uppermost scanning line and the lowermost scanning line in the sub-scanning direction) is reduced. Thus, the number of the line buffer memories can be halved and the imaging magnification can be enlarged as compared with the conventional interlaced scanning.

Although the first embodiment has been described about the structure that the total number n of the light emitting points is 4, the number m of the light emitting points in each light emitting portion is 2, the interlaced period i is 3 and c is 1, the present invention is not limited to the above structure. As a matter of course, arbitrary values satisfying the conditions required in the first or second aspect of the invention may be employed.

Although the first embodiment has been described about the structure that the beam splitter 20 synthesizes light beams, the present invention is not limited to the above structure. For example, a structure may be employed in which incident angles of light beams on the mirror surface 24 of the polygonal mirror 22 are varied among the light emitting portions so as to synthesize the light beams.

[Second Embodiment]

Figure 7:
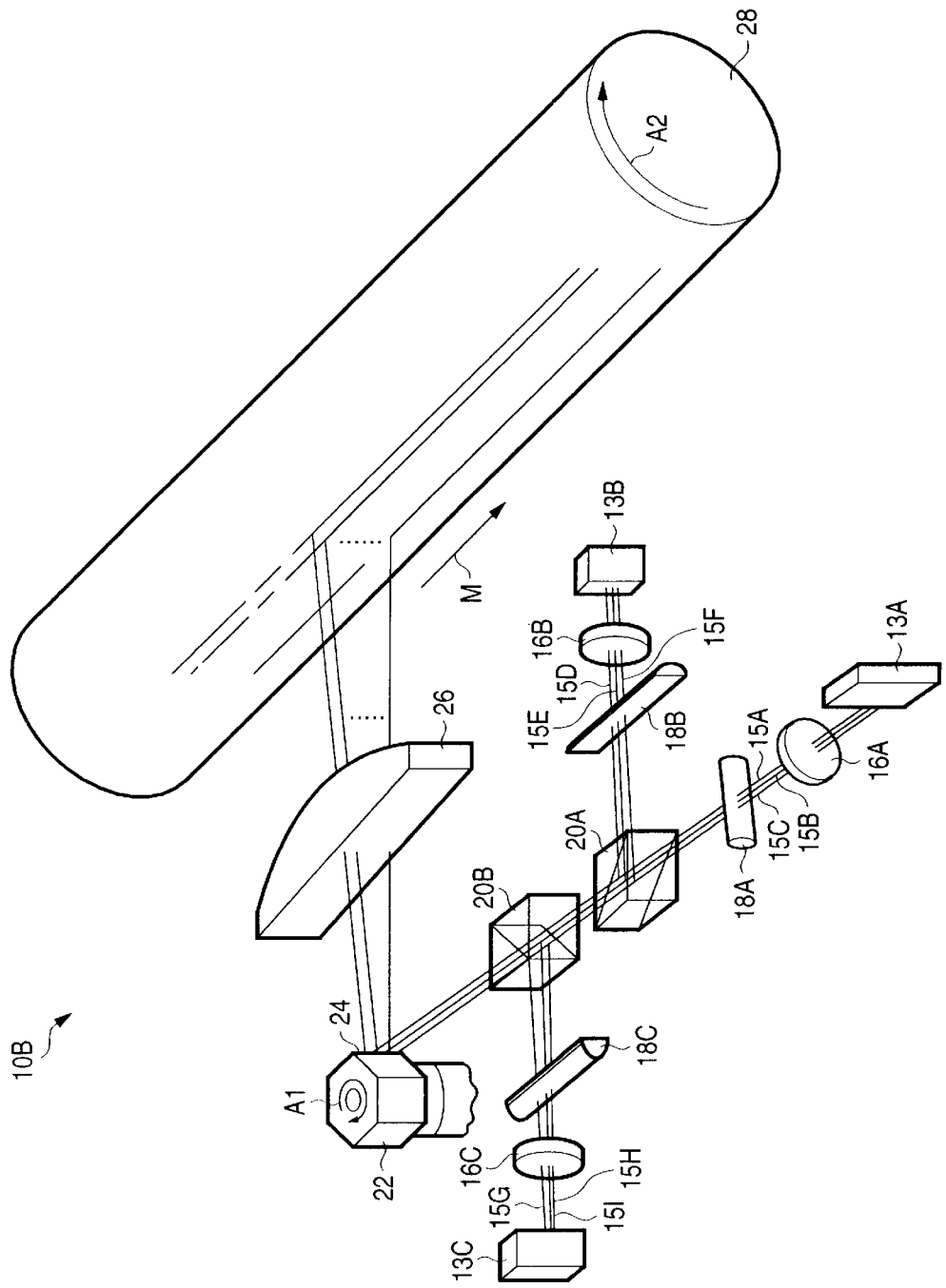
FIG. 7 is a perspective view showing the schematic structure of an optical scanning apparatus according to a second embodiment.

An embodiment of the optical scanning apparatus according to the third aspect of the invention will now be described with reference to FIGS. 7 and 8. In FIG. 7, the same elements as those shown in FIG. 4 are given the same reference numerals and the same elements are omitted from the following description.

As shown in FIG. 7, an optical scanning apparatus 10B according to the second embodiment incorporates three light emitting portions 13A, 13B and 13C each having three light emitting points. The light emitting portion 13A is able to simultaneously emit three light beams 15A to 15C. The light emitting portion 13B is able to simultaneously emit three light beams 15D to 15F. The light emitting portion 13C is able to simultaneously emit three light beams 15G to 15I. Therefore, in the second embodiment, the total number n of the light emitting points is 9 and the number m of light emitting points in each light emitting portion is 3.

In a downstream direction in which light beams are emitted from the light emitting portions 13A to 13C, there are sequentially disposed collimator lenses 16A to 16C for causing light beams to be parallel beams and cylindrical lenses 18A to 18C for correcting inclinations of the planes.

At a position through which both of the light beams 15A to 15C emitted from the light emitting portion 13A and the light beams 15D to 15F emitted from the light emitting portion 13B are allowed to pass, there is disposed a beam splitter 20A for synthesizing incidental light beams. At a position through which both of the light beam emitted from the beam splitter 20A and light beams 15G to 15I emitted from the light emitting portion 13C are allowed to pass, there is disposed a beam splitter 20B for synthesizing the incident light beams.

The beam splitter 20A synthesizes the incident light beams 15A to 15F such that the light beams are downwards positioned in an order as 15A, 15D, 15B, 15E, 15C and 15F in the sub-scanning direction. The beam splitter 20B synthesizes the incident light beams 15A to 15I such that the light beams are downwards positioned in an order as 15A, 15D, 15G, 15B, 15E, 15H, 15C, 15F and 15I in the sub-scanning direction.

A polygonal mirror 22, an imaging lens 26 and a photosensitive member 28 structured similarly to those shown in FIG. 4 are sequentially disposed in a direction of emission of the light beam from the beam splitter 20B.

The optical scanning apparatus 10B according to the second embodiment incorporates line buffer memories for sequentially storing modulation data which must be supplied to the light emitting portions 13A to 13C when interlaced scanning is performed. The structures of the line buffer memories and their peripheral structures are similar to those shown in FIG. 5. However, the structures are different in that the number of the line buffer memories is nine, the selector 54 is omitted and an output terminal of each of the line buffer memories is directly connected to nine light emitting points of the light emitting portions 13A to 13C through a driver.

The conditions required for the optical scanning apparatus 10B according to the second embodiment are as follows.

Number of Light Emitting Points in Each Light Emitting Portion: m=3
Number of Light Emitting Portions: L=3
Total Number of Light Emitting Points: n=mL=9

Interval Between Scanning Lines: $P=(\beta\cdot\gamma)/L=(\beta\cdot\gamma)/3$
Interval Between Scanning Lines: $d1=nP=9P$
Interval Between Scanning Lines: $d2=P$ In the optical scanning apparatus 10B structured as described above, rotation of the polygonal mirror 22 at a predetermined speed in a direction indicated with an arrow A1 shown in FIG. 7 is started. Then, emission of light beams 15A to 15C from the three light emitting points of the light emitting portion 13A is started. The light beams 15A to 15C are allowed to sequentially pass through the collimator lens 16A and the cylindrical lens 18A so as to be made incident upon the beam splitter 20A. Simultaneously with start of emission of the light beams 15A to 15C from the light emitting portion 13A, emission of light beams 15D to 15F from the three light emitting points of the light emitting portion 13B is started. The light beams 15D to 15F are allowed to sequentially pass through the collimator lens 16B and the cylindrical lens 18B so as to be made incident on the beam splitter 20A. Simultaneously with start of emission of the light beams, emission of light beams 15G to 15I from the three light emitting points of the light emitting portion 13C is started. The light beams 15G to 15I are allowed to sequentially pass trough the collimator lens 16C and the cylindrical lens 18C so as to be made incident on the beam splitter 20B.

The beam splitter 20B synthesizes the light beams 15A to 15F made incident from the beam splitter 20A and the light beams 15G to 15I made incident from the light emitting portion 13C so as to emit the synthesized light beam to the mirror surface 24 of the polygonal mirror 22. When the polygonal mirror 22 is rotated in a direction indicated with an arrow A1 shown in FIG. 7, the incident angle of each of the light beams 15A to 15I made from the mirror surface 24 of the polygonal mirror 22 is changed. Thus, the light beams 15A to 15I are deflected in a direction indicated with an arrow M shown in FIG. 7. The deflected light beams 15A to 15I are used to scan (main-scan) the surface of the photosensitive member 28 through the imaging lens 26.

After main scanning has been completed, the photosensitive member 28 is rotated (sub-scanned) in the direction indicated with the arrow A2 shown in FIG. 7 so that the surface of the photosensitive member 28 is moved for a distance d1 between scanning lines (=9P).

Then, the foregoing operations, that is, main scanning and sub-scanning are repeated so that a latent image of an image for one page which must be recorded is recorded on the surface of the photosensitive member 28.

Figure 8:
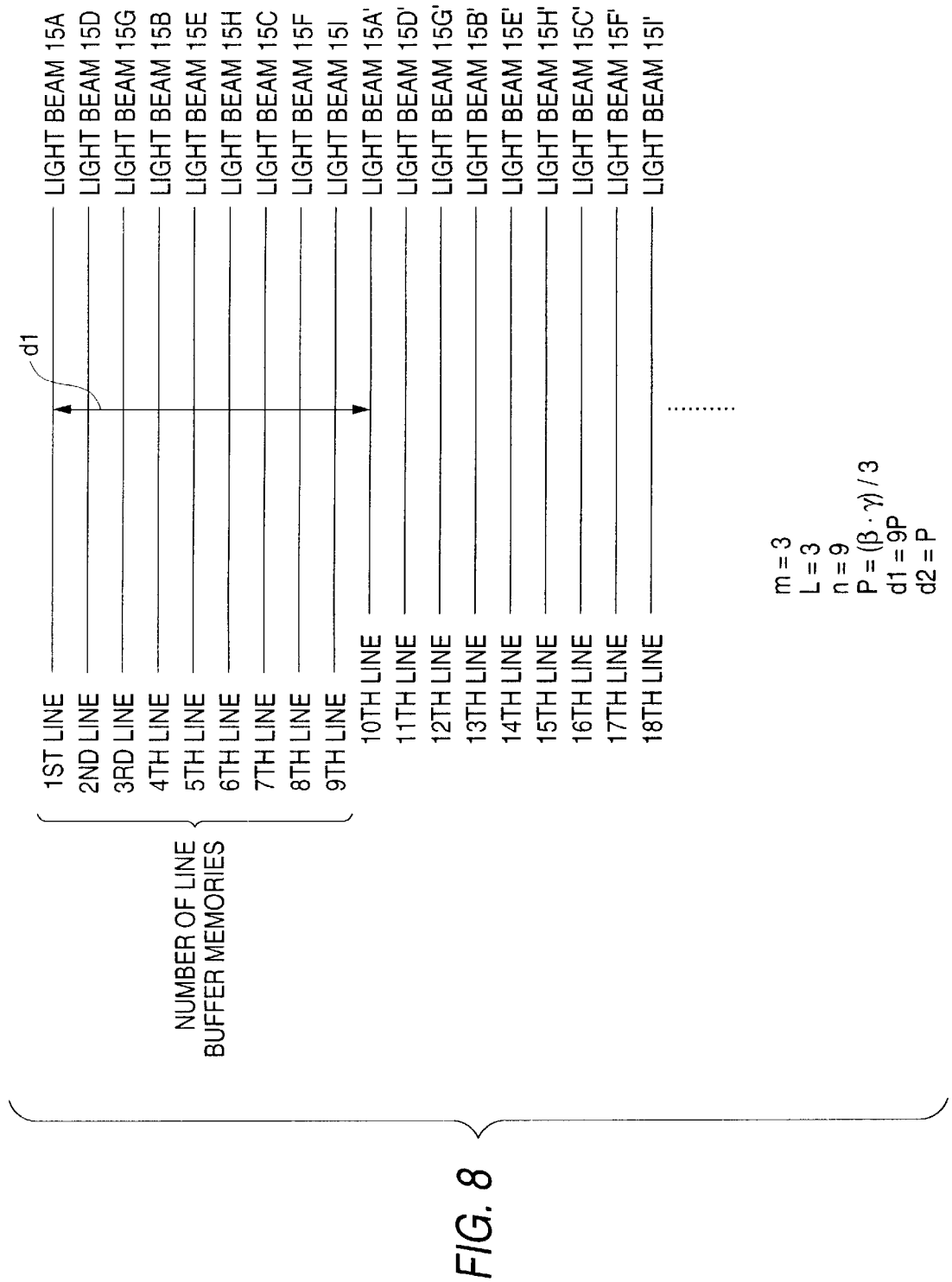
FIG. 8 is a schematic view showing a state of scanning on the surface of the photosensitive member performed by the optical scanning apparatus according to the second embodiment.
Figure 9:
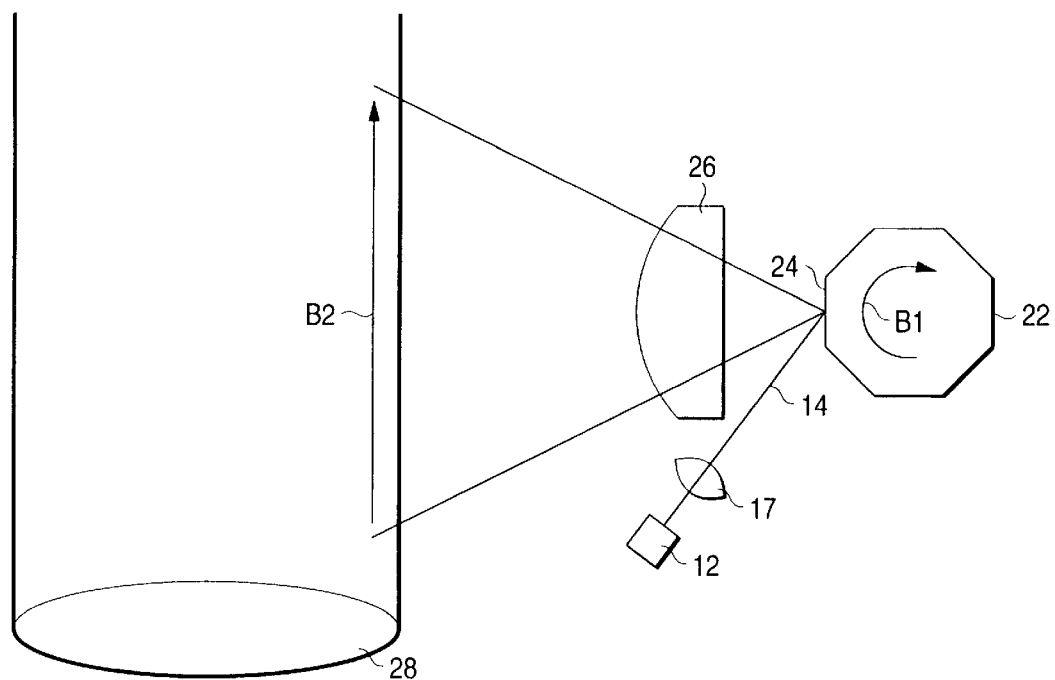
FIG. 9 is structural view showing the schematic structure of a conventional optical scanning apparatus.

FIG. 8 shows a state of interlaced scanning on the surface of the photosensitive member 28 which is performed by the above-mentioned operations. To clearly illustrate a state of writing of the scanning lines at each scanning, FIG. 8 shows a state in which the position at which writing is started is shifted to the right at each scanning using the nine light beams.

As shown in the drawing, first main scanning of first to ninth lines using the light beams 15A, 15D, 15G, 15B, 15E, 15H, 15C, 15F and 15I is performed. As described above, the optical scanning apparatus 10B according to the second embodiment is structured to perform scanning using all of the light beams at this moment of time (first main scanning).

Then, the photosensitive member 28 is rotated such that the surface of the photosensitive member 28 is moved for the interval d1 (=9P) between scanning lines. Then, second main scanning of tenth to eighteenth lines using light beams 15A', 15D', 15G', 15B', 15E', 15H', 15C', 15F' and 15I' is performed.

The above-mentioned operations are repeated so that the surface of the photosensitive member 28 is scanned at a predetermined scanning density without any repetition. At this time, as shown in FIG. 8, the number of required line buffer memories is nine (for nine lines) which is the same number as that required for adjacent scanning.

As described above, the optical scanning apparatus 10B according to the second embodiment has the structure that the number of the light emitting portions is three so that scanning apparently similar to adjacent scanning is performed. Thus, the number of the line buffer memories can be reduced as compared with the conventional interlaced scanning.

Although the second embodiment has been described about the structure that the number m of the light emitting points in each light emitting portion is 3 and the number L of the light emitting portions is 3, the present invention is not limited to this. As a matter of course, arbitrary values satisfying the conditions required in the third aspect of the invention may be employed.

Although the second embodiment has been described about the structure the beam splitters 20A and 20B synthesize light beams, the present invention is not limited to the above structure. For example, a structure may be employed in which incident angles of light beams on the mirror surface 24 of the polygonal mirror 22 are varied among the light emitting portions so as to synthesize the light beams.

[Third Embodiment]

An embodiment of the optical scanning apparatus according to the fourth aspect of the invention will now be described.

The optical scanning apparatus according to the third embodiment has a similar structure to that according to the first embodiment shown in FIGS. 4 and 5. Therefore, description thereof is omitted here. Note that the conditions which must be satisfied are different from each other between the third embodiment and the first embodiment.

To minimize the number of the line buffer memories, the third embodiment has the structure which employs the relationship $a=b=1$ which is able to minimize both of the interval d1 between scanning lines on the surface of the photosensitive member which is scanned by the same light emitting point and the interval d2 between scanning lines on the surface of the photosensitive member realized by a predetermined light emitting point of one of the light emitting portions and a light emitting point corresponding to the predetermined light emitting point and included in the other light emitting portion. Therefore, the optical scanning apparatus according to the third embodiment employs the following conditions.

Total Number of Light Emitting Points: $n=4$
Number of Light Emitting Points in Each Light Emitting Portion: $m=2$
Interval Between Scanning Lines: $P=(\beta\cdot\gamma)/(an+2)=(\beta\cdot\gamma)/6$
Interval Between Scanning Lines: $d1=nP=4P$
Interval Between Scanning Lines: $d2=bP=P$ The optical scanning apparatus structured as described above is operated similarly to that according to the first embodiment. Therefore, the number of the line buffer memories required for the optical scanning apparatus according to the third embodiment to perform interlaced scanning is eight (for eight lines), as shown in FIG. 6. Thus, the number can be made to be half of the number (sixteen) required to perform the conventional interlaced scanning shown in FIG. 10. Since the interval P between scanning lines is made to be $(\beta\cdot\gamma)/6$, the imaging magnification $\beta$ can be enlarged to 6/5 times (=1.2 times) as compared with the case shown in FIG. 10 in which the conventional interlaced scanning is performed ($P=(\beta\cdot\gamma)/5$).

As described above, the optical scanning apparatus 10 according to the third embodiment has the structure that the number of the light emitting portions is made to be two. Thus, the interval between the first scanning line and the final scanning line (the uppermost scanning line and the lowermost scanning line in the sub-scanning direction) at first scanning is shortened. Therefore, the number of the line buffer memories can be halved and the imaging magnification can be enlarged as compared with the conventional interlaced scanning.

Although the third embodiment has been described about the structure in which the total number m of the light emitting points is 4, the number m of light emitting points in each light emitting portion is 2 and each of a and b is 1, the present invention is not limited to this. As a matter of course, the above values may be arbitrary values which satisfy the conditions required in the fourth aspect of the invention.

Although each embodiment has been described about a structure in which the present invention is applied to an electrophotographic process, the present invention is not limited to this. For example, the present invention may be applied to any type of apparatus, such as a recording apparatus using a usual photosensitive film and a magnetic recording apparatus, which performs optical scanning.

The optical scanning apparatus according to the first and second aspects of the invention has the structure that the number of the light emitting portions is two. Moreover, the two light emitting portions are disposed such that intervals among scanning lines scanned by light beams emitted from adjacent light emitting points of one of the light emitting portions are scanned by a light beam emitted from at least one light emitting point of the other light emitting portion. Thus, the interval is shortened which is the interval between the first scanning line and the final scanning line (the uppermost scanning line and the lowermost scanning line in the sub-scanning direction) when the surface of the photosensitive member is simultaneously scanned. Therefore, an effect can be obtained in that the number of the line buffer memories can be reduced.

The optical scanning apparatus according to the third aspect of the invention has the structure that a plurality of the light emitting portions are provided to perform scanning apparently similar to adjacent scanning. Therefore, an effect can be obtained in that the number of the line buffer memories can be reduced to the number which is required when adjacent scanning is performed.

The optical scanning apparatus according to the fourth aspect of the invention has the structure that the number of the light emitting portions is two. Moreover, the two light emitting portions are disposed such that intervals among scanning lines scanned by light beams emitted from adjacent light emitting points of one of the light emitting portions are scanned by a light beam emitted from at least one light emitting point of the other light emitting portion. Thus, the interval is shortened which is the interval between the first scanning line and the final scanning line (the uppermost scanning line and the lowermost scanning line in the sub-scanning direction) when the surface of the photosensitive member is simultaneously scanned. Therefore, an effect can be obtained in that the number of the line buffer memories can be reduced.

What is claimed is:

1. An optical scanning apparatus comprising:

two light emitting portions each having a plurality of light emitting points each of which can independently be light-modulated and which are disposed in a predetermined direction;

an optical system for imaging light beams emitted from said two light emitting portions on a surface of a photosensitive member; and a deflecting unit for simultaneously deflecting the light beams emitted from said two light emitting portions to a main scanning direction intersecting the predetermined direction so as to scan the surface of the photosensitive member, wherein said two light emitting portions are disposed such that intervals among scanning lines scanned by light beams emitted from adjacent light emitting points of one of said light emitting portions are scanned by a light beam emitted from at least one light emitting point of the other light emitting portion so as to perform interlaced scanning, and assuming that n is the total number of the light emitting points, m is the number of the light emitting points of each light emitting portion, P is an interval between adjacent scanning lines on the surface of the photosensitive member, $\beta$ is an imaging magnification in a direction perpendicular to the main scanning direction, $\gamma$ is an interval between the light emitting points on each light emitting portion, i is an interlaced period which is determined by the number of scanning lines which are interlaced by the same light emitting point at each sub-scanning, d1 is an interval between scanning lines on the surface of the photosensitive member which is scanned by the same light emitting point and d2 is an interval between scanning lines on the surface of the photosensitive member realized by a predetermined light emitting point of one of said light emitting portions and a light emitting point of the other light emitting portion corresponding to the predetermined light emitting point, the following conditions are satisfied:

n is an even number satisfying $n \geq 4$, n=2 m, $P=(\beta \cdot \gamma)/(2 \cdot i)$, i is an integer satisfying $i \geq 2$, i and m are relatively prime, d1=nP and d2=cP (where c is an odd number satisfying $1 \leq c$).

2. The optical scanning apparatus according to claim 1, wherein when d2 satisfies d2=cP, c is an odd number satisfying $1 \leq c \leq i$.

* * * * *